United States Patent [19]

Kawasaki et al.

[11] Patent Number: 5,736,649
[45] Date of Patent: Apr. 7, 1998

[54] VORTEX FLOWMETER

[75] Inventors: Kazumasa Kawasaki; Yutaka Inada, both of Kanagawa-ken; Koichi Tashiro, Chiba-ken, all of Japan

[73] Assignee: Tokico Ltd., Kanagawa-ken, Japan

[21] Appl. No.: 701,447

[22] Filed: Aug. 22, 1996

[30]  Foreign Application Priority Data

Aug. 23, 1995 [JP] Japan .................... 7-237749
Jan. 19, 1996 [JP] Japan .................... 8-007919

[51] Int. Cl.⁶ .................................................. G01F 1/32
[52] U.S. Cl. .................................. 73/861.23; 73/861.22
[58] Field of Search ........................... 73/861.22, 861.23, 73/118.2

[56]  References Cited

U.S. PATENT DOCUMENTS

| | | | |
|---|---|---|---|
| 4,815,324 | 3/1989 | Tada et al. | 73/861.22 |
| 4,932,382 | 6/1990 | Fujimoto et al. | 73/861.22 |
| 4,966,040 | 10/1990 | Ohmae | 73/861.22 |
| 4,977,781 | 12/1990 | Misumi et al. | 73/861.22 |
| 5,020,373 | 6/1991 | Kamiunten et al. | 73/861.22 |

FOREIGN PATENT DOCUMENTS

| | | | |
|---|---|---|---|
| 1-148913 | 6/1989 | Japan | 73/861.22 |
| 1-148914 | 6/1989 | Japan | 73/861.22 |
| 2-95213 | 6/1990 | Japan | 73/861.22 |
| 5-27048 | 4/1993 | Japan. | |

*Primary Examiner*—Richard Chilcot
*Assistant Examiner*—Ronald L. Biegel
*Attorney, Agent, or Firm*—Wenderoth, Lind & Ponack

[57]  ABSTRACT

In a Karman vortex flowmeter according to the present invention, first and second ultrasonic transmission/reception devices are offset from each other along a flowing direction of fluid, and a switching device alternately switches the ultrasonic transmission/reception devices so that the ultrasonic transmission/reception devices can alternately perform transmission and reception. There is also provided a propagation time difference detector for determining a time difference between an ultrasonic wave propagation time when one of the ultrasonic transmission/reception devices performs the transmission, and an ultrasonic wave propagation time when the other of the ultrasonic transmission/reception devices performs the transmission, and for determining a flow rate of the fluid on the basis of the time difference. When no Karman vortex is generated or when the number of generated Karman vortices is greatly reduced, the minute flow rate of the fluid is measured by the propagation time difference detector.

11 Claims, 3 Drawing Sheets

VORTEX FLOWMETER

BACKGROUND OF THE INVENTION

1. Field of the Invention

The present invention relates to a vortex flowmeter for measuring a flow rate of fluid.

2. Related Background Art

As an example of conventional vortex flowmeters, there has been proposed a vortex flowmeter in which a vortex shedder for generating a Karman vortex is disposed within a pipe through which fluid flows and a pair of opposed ultrasonic transmission/reception devices are disposed with a Karman vortex generating area disposed therebetween.

In this vortex flowmeter, when the fluid flows through a pipe, Karman vortices are generated alternately, by means of the vortex shedder on both sides of the vortex shedder at an interval proportional to the flow velocity, and, when an ultrasonic wave is propagated to the Karman vortex generating area, an amount by which the ultrasonic wave is modulated by the Karman vortex is detected, thereby determining the flow velocity and accordingly the flow rate.

In the above-mentioned conventional technique, if the flow rate of the fluid is decreased, since the number of generated Karman vortices is considerably decreased or the Karman vortex itself is not generated, the flow rate of the fluid cannot be measured.

SUMMARY OF THE INVENTION

The present invention aims to eliminate the above-mentioned conventional drawback, and an object of the present invention is to provide a vortex flowmeter in which a flow rate of fluid can be measured through a wide range from a high flow rate to a minute flow rate.

To achieve the above object, according to the present invention, there is provided a vortex flowmeter comprising a vortex shedder provided in a flow path or channel, an ultrasonic transmitter and an ultrasonic receiver disposed on both sides of the flow path and in a portion downstream of the vortex shedder and spaced apart from the vortex shedder by a predetermined distance. The transmitter and receiver are offset from each other along a flow direction of the flow path. The flow meter further comprises a memory means for storing first data representative of a relation between generation frequency of Karman vortices generated by the vortex shedder and the flow rate of fluid flowing in the flow path and second data representative of a relation between a difference of an ultrasonic wave propagation time relative to the reference propagation time when the flow rate of fluid flowing in the flow path is substantially zero and the flow rate of the fluid flowing in the flow path, a first calculation means for determining the generation frequency of the Karman vortex on the basis of a detection signal obtained from the ultrasonic receiver and for determining the flow rate on the basis of the first data, a second calculation means for measuring the ultrasonic wave propagation time between the ultrasonic transmitter and the ultrasonic receiver, for determining a difference between the ultrasonic wave propagation time when the flow rate of the fluid is substantially zero and the measured ultrasonic wave propagation time and for determining the flow rate of the fluid flowing in the flow path from the difference between the ultrasonic wave propagation times on the basis of the second date, and an output switching means for switching so that, when the flow rate of the fluid is greater than a predetermined value, the flow rate of the fluid determined by the first calculation means is outputted and, when the flow rate of the fluid is smaller than the predetermined value, the flow rate of the fluid determined by the second calculation means is outputted.

The present invention further provides a vortex flowmeter comprising a vortex shedder provided in a flow path, an ultrasonic sensor means comprised of a pair of transmission/reception portions disposed on both sides of the flow path in a portion downstream of the vortex shedder and spaced apart from the vortex shedder by a predetermined distance. The transmission/reception portions are offset from each other along a flow direction of the flow path. The flow meter further comprises a memory means for storing first data representative of a relation between generation frequency of Karman vortices generated by the vortex shedder and a flow rate of fluid flowing in the flow path and fourth data representative of a relation between (a) a difference in an ultrasonic wave propagation time between the case when one of the pair of transmission/reception portions performs transmission and the case when the other transmission/reception portion performs transmission; and (b) the flow rate of the fluid flowing in the flow path, a first calculation means for determining the generation frequency of the Karman vortices on the basis of a detection signal obtained from a reception portion of the ultrasonic sensor means and for determining the flow rate on the basis of the first data, a third calculation means for determining a difference between an ultrasonic wave propagation time when the ultrasonic sensor means performs transmission from the upstream side to the downstream side and an ultrasonic wave propagation time when the ultrasonic sensor means performs the transmission from the downstream side to the upstream side and for determining the flow rate of the fluid flowing in the flow path on the basis of the fourth date, and an output switching means for switching so that, when the flow rate of the fluid is greater than a predetermined value, the flow rate of the fluid determined by the first calculation means is outputted and, when the flow rate of the fluid is smaller than the predetermined value, the flow rate of the fluid determined by the third calculation means is outputted.

DETAILED DESCRIPTION OF THE PREFERRED EMBODIMENTS

The present invention will now be explained in connection with an embodiment thereof with reference to FIGS. 1 and 2.

Figure 1:
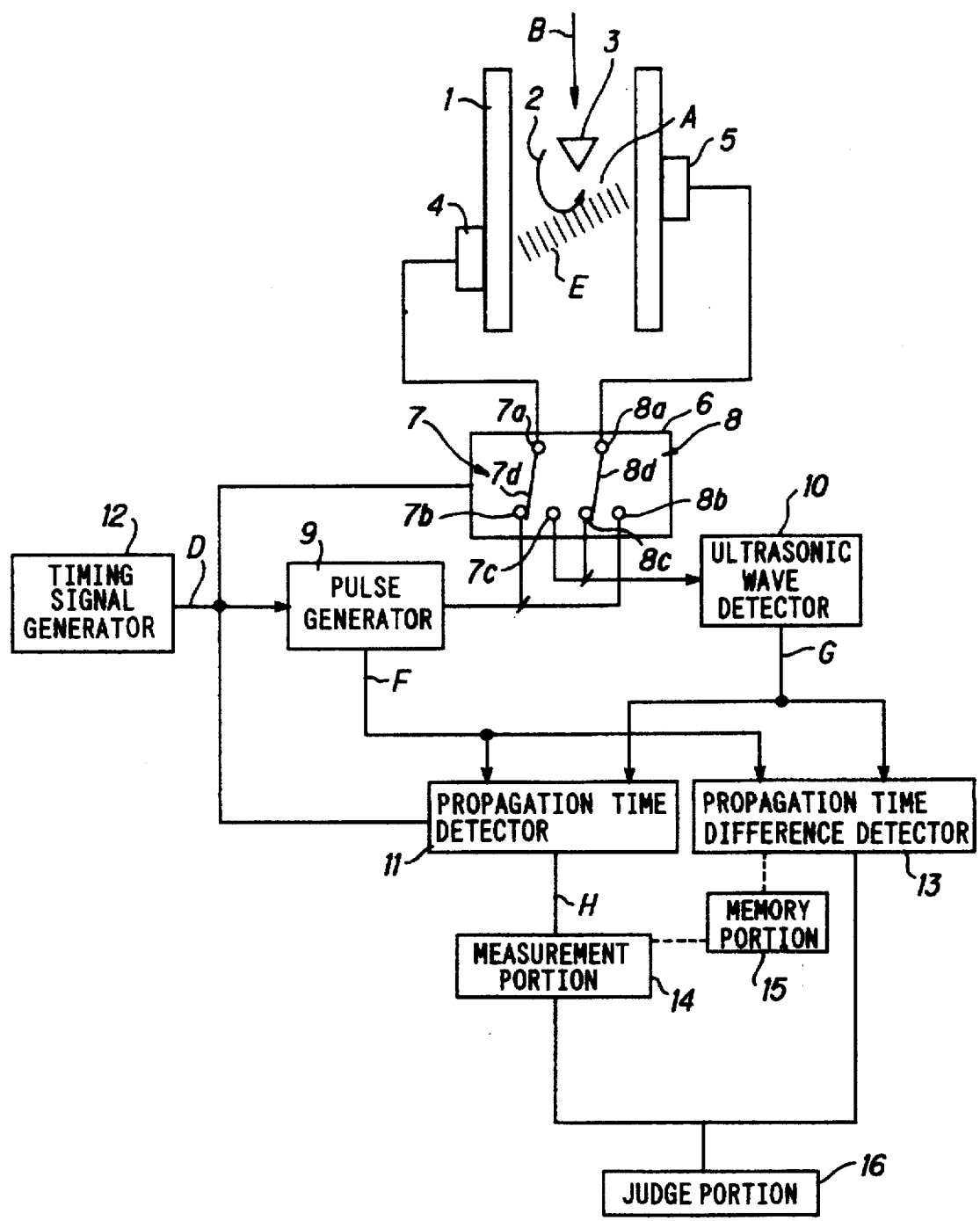
FIG. 1 is a schematic illustration of a vortex flowmeter according to a preferred embodiment of the present invention.
Figure 2:
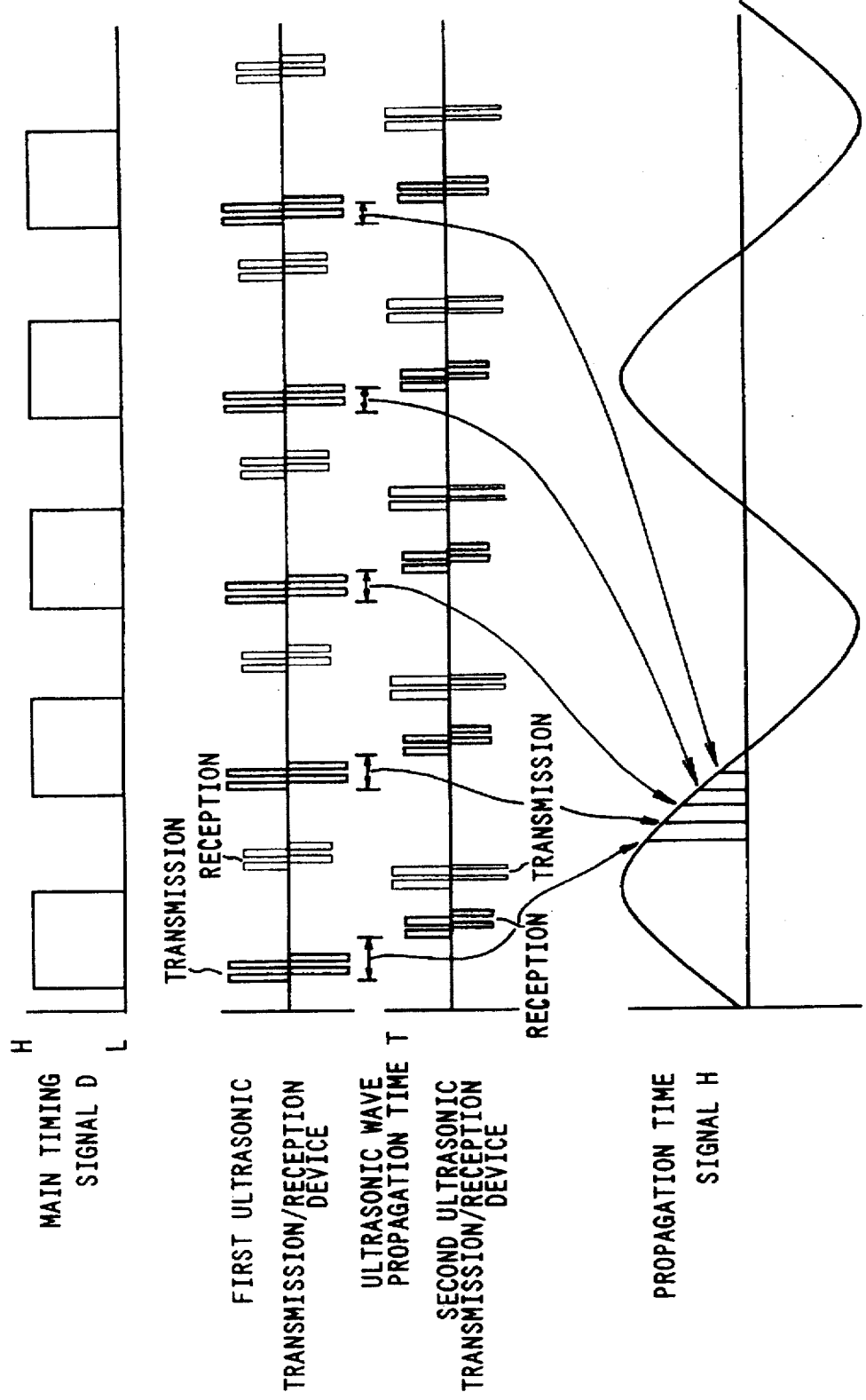
FIG. 2 is a timing chart showing an operation of the vortex flowmeter.

In FIGS. 1 and 2, a triangular prismatic vortex shedder 3 for generating a Karman vortex 2 is disposed within a pipe 1 so that Karman vortices 2 are alternately generated at a portion downstream of the vortex shedder 3 at an interval proportional to the flow velocity. The vortex shedder 3 is not limited to the triangular prismatic shape but may have any other cross-sectional configuration. A pair of ultrasonic transmission/reception devices (referred to as "first and second ultrasonic transmission/ reception devices"

hereinafter) 4, 5 are placed to face each other at a portion downstream of the vortex shedder. The devices are offset from each other in the fluid flowing direction B by a predetermined distance.

First and second switches 7 and 8 which constitute a switching device 6 are connected to the first and second ultrasonic transmission/reception devices 4 and 5, respectively. A pulse generator 9 and an ultrasonic wave detector 10 are connected to the first and second switches 7, 8 so that, by opening or closing the switches, the first and second ultrasonic transmission/reception devices 4, 5 are selectively connected to the pulse generator 9 and the ultrasonic wave detector 10.

The first switch 7 includes a first transmitter-side fixed contact 7a connected to the first ultrasonic transmission/reception device 4, a first generator-side fixed contact 7b connected to the pulse generator 9, a first detector-side fixed contact 7c connected to the ultrasonic wave detector 10, and a first movable contact piece 7d having one end connected to the transmitter-side first fixed contact 7a and the other end connectable to the generator-side first fixed contact 7b or the detector-side first fixed contact 7c. The second switch 8 includes a second transmitter-side fixed contact 8a connected to the second ultrasonic transmission/reception device 5, a second generator-side fixed contact 8b connected to the pulse generator 9, a second detector-side fixed contact 8c connected to the ultrasonic wave detector 10, and a second movable contact piece 8d having one end connected to the transmitter-side second fixed contact 8a and the other end connectable to the generator-side second fixed contact 8b or the detector-side second fixed contact 8c. The first and second movable contact pieces 7d, 8d are operated in synchronism with each other.

A timing signal generator 12 is connected to the switching device 6, the pulse generator 9 and a propagation time detector 11 (described later). The timing signal generator 12 serves to output a timing signal D (referred to as "main timing signal" hereinafter) to the switching device 6 to effect the opening/closing operations of the first and second switches 7 and 8. In the first and second switches 7, 8, when the main timing signal D is in an H (high) level, the first and second movable contact pieces 7d, 8d are positioned as shown in FIG. 1, with the result that the first ultrasonic transmission/reception device 4 is connected to the pulse generator 9 and the second ultrasonic transmission/reception device 5 is connected to the ultrasonic wave detector 10. In this case, the first ultrasonic transmission/reception device 4 acts as a transmitter for transmitting an ultrasonic wave E and the second ultrasonic transmission/reception device 5 acts as a receiver for receiving the ultrasonic wave E.

On the other hand, when the main timing signal D is in an L (low) level; the first and second movable contact pieces 7d, 8d are switched, with the result that the second ultrasonic transmission/reception device 5 is connected to the pulse generator 9 and the first ultrasonic transmission/reception device 4 is connected to the ultrasonic wave detector 10. In this case, the second ultrasonic transmission/reception device 5 acts as a transmitter for transmitting the ultrasonic wave E and the first ultrasonic transmission/reception device 4 acts as a receiver for receiving the ultrasonic wave E.

The pulse generator 9 generates a pulse signal in synchronism with the main timing signal D, thereby driving one of the ultrasonic transmission/reception devices 4, 5 which is set as the transmitter (first ultrasonic transmission/reception device 4 in FIG. 1). As a result, the ultrasonic transmission/reception device 4 which is set as the transmitter emits the ultrasonic wave E (pulse) into the pipe 1. Further, when the main timing signal D is inputted, the pulse generator 9 outputs a transmission timing signal F to the propagation time detector 11 and a propagation time difference detector (auxiliary flow rate detection means) 13.

As mentioned above, after the ultrasonic wave E emitted from one of the ultrasonic transmission/reception devices 4, 5 which is set as the transmitter is propagated in the pipe 1, the ultrasonic wave E is received by the other ultrasonic transmission/reception device (second ultrasonic transmission/reception device 5 in FIG. 1), and the received signal is inputted to the ultrasonic detector 10 through the switching device 6 (through the second switch 8 in FIG. 1).

The ultrasonic detector 10 receives the signal from the other of the ultrasonic transmission/reception devices 4, 5 which is set as the receiver through the switching device 6, and the inputted signal is amplified and its waveform is reshaped. If a value of the input signal exceeds a predetermined value, an ultrasonic wave arrival timing signal G representing the fact that the ultrasonic wave E arrived is outputted to the propagation time detector 11 and the propagation time difference detector 13.

The propagation time detector 11 determines a time period from the time when the transmission timing signal F is inputted to the time when the ultrasonic wave arrival timing signal G is inputted, i.e., an ultrasonic wave propagation time T between the first and second ultrasonic transmission/reception devices 4 and 5. By converting magnitude of the ultrasonic wave propagation time T into a voltage value, a propagation time signal H shown in FIG. 2 is obtained. The propagation time signal H is outputted to a measurement portion 14.

The measurement portion 14 acts as a first calculation means and determines frequency of the change in the propagation time signal and accordingly generation frequency of the vortices on the basis of a relation between the change in the propagation time signal H and time lapse (abscissa).

Next, a reason why the generation frequency of the vortices can be judged from the frequency of the change in the propagation time signal H will be explained.

The Karman vortices 2 are regularly generated in the Karman vortex generating area A and the interval of generation is proportional to the velocity of the fluid. On a line connecting between the first and second ultrasonic transmission/reception devices 4 and 5, the direction (orientation) of the Karman vortices with respect to the propagating direction of the ultrasonic wave E is changed in accordance with the generation frequency of the vortices. When the propagating direction of the ultrasonic wave E coincides with the direction of a Karman vortex, the propagation time of the ultrasonic wave E becomes shorter; whereas, when the propagating direction of the ultrasonic wave E is opposed to the direction of a Karman vortices, the propagation time of the ultrasonic wave E becomes longer. Thus, since the magnitude of the ultrasonic wave propagation time T of the ultrasonic wave is changed in accordance with the generation of the Karman vortices, the flow velocity of the fluid and accordingly the flow rate can be determined from the frequency of the change in the propagation time signal H, for example, as shown in FIG. 2.

When the generation frequency of the vortices is determined in the measurement portion 14, the corresponding flow rate of the fluid in the flow path 1 is determined from the memory portion 15. A relation between the generation frequency of the Karman vortices and the flow rate is previously stored in the memory portion 15.

In FIG. 2, while an example that the first and second ultrasonic transmission/reception devices 4 and 5 (corresponding signals are shown by the fat solid lines and the thin solid lines, respectively) perform the transmission and the reception alternately is shown, in the detection of the Karman vortex, one of the first and second ultrasonic transmission/reception devices 4 and 5 may be fixed as a transmitter. In the illustrated embodiment, the propagation time detector 11 determines the ultrasonic wave propagation time T when the first ultrasonic transmission/reception device 4 effects the transmission (fat solid line in FIG. 2), i.e., when the main timing signal is in the H level, and obtains the propagation time signal H as shown in FIG. 2.

The propagation time difference detector 13 acts as a second calculation means and serves to alternately measure a time period from the time when the transmission timing signal F is inputted to the time when the ultrasonic wave reach timing signal G is inputted, to seek the ultrasonic wave propagation time T between the first and second ultrasonic transmission/reception devices 4 and 5 when the first ultrasonic transmission/reception device 4 effects the transmission and the ultrasonic wave propagation time T between the first and second ultrasonic transmission/reception devices 4 and 5 when the second ultrasonic transmission/reception device 5 effects the transmission, to seek a difference between the propagation times, and to determine the flow rate of the fluid on the basis of the propagation time difference.

The determination of the flow rate of the fluid from the propagation time difference is based on the following relation between the flow velocity and the propagation speed in the fluid. That is to say, while the ultrasonic wave E is being propagated in the fluid, when the ultrasonic wave E advances from the upstream side to the downstream side, the propagation speed becomes faster, whereas, when the ultrasonic wave E advances from the downstream side to the upstream side, the propagation speed becomes slower. Since a difference between these propagation speeds (propagation speed difference) is proportional to the flow velocity, the flow rate of the fluid can be determined from the propagation speed difference.

Incidentally, a relation between the propagation speed difference and the flow rate is previously stored in the memory portion 15, so that the propagation time difference detector 13 can determine the flow rate from the data in the memory portion 15.

The measurement portion 14 and the propagation time difference detector 13 are connected to a judge portion 16. Although the judge portion 16 normally outputs an output signal of the measurement portion 14 as a flow rate signal, when it is judged that there is no vortex or the generation of vortices is lower than a predetermined level on the basis of the result from the measurement portion, the judge portion 16 outputs an output signal of the propagation time difference detector 13 as a signal representative of the flow rate. Alternatively, the judge portion may operate in such a manner that when the flow rate indicated by the propagation time difference detector 13 becomes smaller than a predetermined value, the output signal of the propagation time difference detector 13 is outputted as the signal representative of the flow rate. Although the measurement of the flow rate based on the vortex is practically used within a range in which Re (Reynolds number) is 10,000 or more, theoretically, the measurement can be performed within a lower range in which the lower limit of Re is about 4,000. Accordingly, a threshold value is determined within a range of 10,000≧Re≧4,000, and the output is switched on the basis of the threshold value.

In the vortex flowmeter having the above-mentioned construction, when a predetermined number (or more) of Karman vortices are generated, the propagation time detector 11 determines the ultrasonic wave propagation time T between the first and second ultrasonic transmission/reception devices 4 and 5, obtains the propagation time signal H and outputs the propagation time signal H to the measurement portion 14. In response to this, the measurement portion 14 determines the frequency of the propagation time signal H and measures the flow rate of the fluid.

If no Karman vortex is generated or the number of generated Karman vortices is significantly decreased to such a degree that measurement of the Karman vortex is practically impossible, the judge portion 16 judges the reduction of the Karman vortices, thereby allowing operation of the propagation time difference detector 13. As a result, the time period from the time when the transmission timing signal F is inputted to the time when the ultrasonic wave reach timing signal G is inputted is alternately measured, thereby determining the ultrasonic wave propagation time T when the first ultrasonic transmission/reception device 4 effects the transmission and the ultrasonic wave propagation time T when the second ultrasonic transmission/reception device 5 effects the transmission, seeking the difference between the propagation times, and determining the flow rate of the fluid on the basis of the propagation time difference.

As stated above, when no Karman vortex is generated or the number of generated Karman vortices is significantly decreased, by operating the propagation time difference detector 13, the flow rate of fluid of a minute speed can be measured. Thus, the flow rate of the fluid can be measured through a wide range from a high flow rate to a minute flow rate.

When no Karman vortex 2 is generated, since the fluid in the pipe 1 is flowing in a laminar flow condition, by determining a difference between the propagation time from the first ultrasonic transmission/reception device 4 to the second ultrasonic transmission/reception device 5 and the propagation time from the second ultrasonic transmission/reception device 5 to the first ultrasonic transmission/reception device 4 and by effecting correction in consideration of flow velocity distribution in the laminar flow, an average flow velocity of the fluid in the pipe 1 can be determined. Since the flow rate is measured on the basis of the propagation time difference, influence of change in sound velocity due to temperature change can be canceled. That is to say, since the temperature gives the same influence upon the propagation speeds of the ultrasonic wave advancing toward the upstream side and the ultrasonic wave advancing toward the downstream side, when the difference between the propagation speeds is determined the influence of the temperature can be canceled.

Since the measurement of the minute flow rate (for example, when no Karman vortex is generated) is performed by the first and second ultrasonic transmission/reception devices 4, 5 which are also used to detect the Karman vortex, the flow rate of the fluid can be measured through a wide range from a high flow rate to a minute flow rate, without making the construction of the flowmeter complicated.

Since the minute flow rate can be measured, it is possible to detect minute change in flow rate due to leakage of fluid from the pipe 1, thereby affording a leakage detecting function to the vortex flowmeter.

In the above-stated embodiment, while an example that the measurement portion 14 detects the generation frequency of the Karman vortices and the propagation time difference detector 13 is operated by the Karman vortex reduction signal outputted by the measurement portion 14 when the detected value becomes smaller than the reference value is explained, alternatively, an amplitude of a Karman vortex signal may be detected and the propagation time difference detector 13 may be operated when the detected value becomes smaller than a predetermined value.

According to the present invention, when the predetermined number (or more) of Karman vortices are generated, the generation frequency of the Karman vortex is determined to measure the flow rate of the fluid (permitting measurement of large flow rate), and, when no Karman vortex is generated or the number of generated Karman vortices is significantly decreased to such a degree that measure of the Karman vortex is practically impossible, the auxiliary flow rate detection means determines the ultrasonic wave propagation time between the pair of ultrasonic transmission/reception devices when one of the pair of ultrasonic transmission/reception devices effects the transmission and ultrasonic wave propagation time between the pair of ultrasonic transmission/reception devices when the other of the pair of ultrasonic transmission/reception devices effects the transmission and determines the flow rate of the fluid on the basis of the propagation time difference (permitting measurement of minute flow rate). Thus, the flow rate of the fluid can be measured through the wide range from the high flow rate to the minute flow rate.

Further, when no Karman vortex is generated, since the fluid in the pipe is flowing in the laminar flow condition, by determining a difference between the propagation time from one of the pair of ultrasonic transmission/reception devices to the other of the pair of ultrasonic transmission/reception devices and the propagation time from the other of the pair of ultrasonic transmission/reception devices to one of the pair of ultrasonic transmission/reception devices and by effecting the correction in consideration of flow velocity distribution in the laminar flow, the average flow velocity of the fluid in the pipe can be determined. Since the flow fate is measured on the basis of the propagation time difference, influence of change in sound velocity due to temperature change can be canceled.

Figure 3:
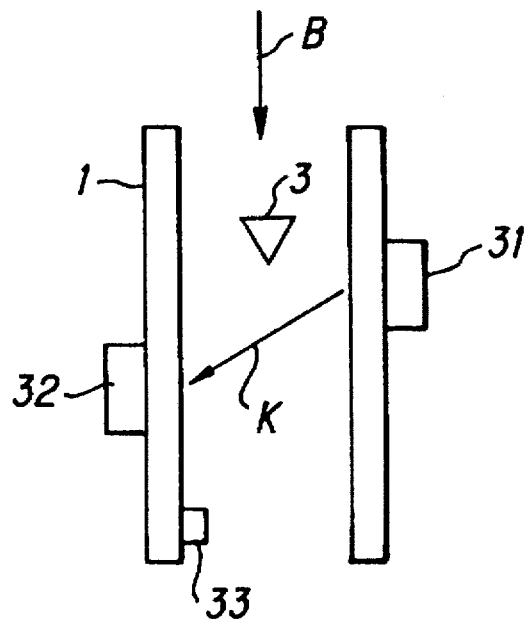
FIG. 3 is a first alteration of the embodiment of FIG. 1.

FIG. 3 shows a first alteration of the embodiment of the present invention. In this alteration, in place of the ultrasonic transmission/reception devices 4, 5 shown in FIG. 1, there are provided a transmitter 31 and a receiver 32. Accordingly, the ultrasonic wave is transmitted only in a direction shown by the arrow K. Also in this case, the generation of Karman vortices can be detected on the basis of change in propagation speed of the ultrasonic wave K and the flow rate can be determined on the basis of the generation frequency of the Karman vortices. Further, when data regarding the propagation speed of the ultrasonic wave when the flow velocity is zero is previously stored in the memory portion 15 (FIG. 1) and a relation between a difference of this propagation speed data from the measured propagation speed of the ultrasonic wave K and the flow rate is also previously stored in the memory portion, the flow rate can be determined by the propagation time difference detector.

In the alteration shown in FIG. 3, since the speed of the ultrasonic wave passing through the path K is varied with the temperature, it is desirable that a temperature detecting device 33 is provided and data regarding the speed change of the ultrasonic wave due to the temperature change is previously stored in the memory portion so that correction of measurement of the flow rate can be performed. This is performed, for example, by storing a relation between the propagation speed of the ultrasonic wave when the flow velocity is zero and the temperature in the memory portion and by using the propagation speed of the ultrasonic wave (when the flow velocity is zero) corresponding to the temperature detected by the temperature detecting device 33 as a reference value.

Figure 4A:
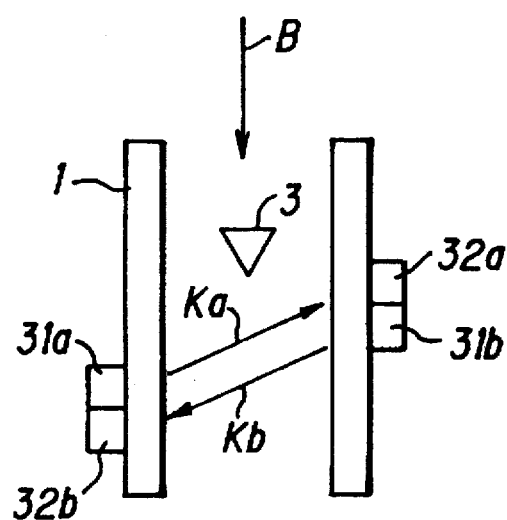
FIG. 4 is a second alteration of the embodiment of FIG. 1.
Figure 4B:
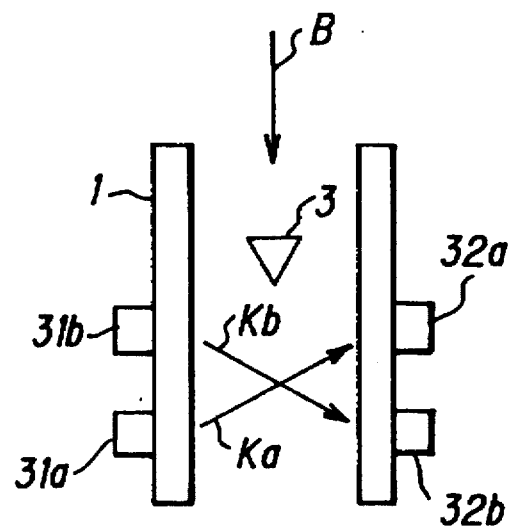

FIG. 4 shows a second alteration of the embodiment of the present invention. In this alteration, there are independently provided a first set comprised of a transmitter 31a and a receiver 32a, and a second set comprised of a transmitter 31b and a receiver 32b. The arrangement shown in section (a) of FIG. 4 has the same technical effect as that of the arrangement shown in section (b) of FIG. 4. In this case, there is an advantage that the ultrasonic wave advancing along a path Ka and the ultrasonic wave advancing along a path Kb can be transmitted simultaneously. Also in this case, since two ultrasonic waves advance in opposite directions, the correction of temperature can be omitted. The principle of the measurement of the flow rate is the same as that shown in FIG. 1.

What is claimed is:

1. A vortex flowmeter comprising:

a vortex shedder provided in a flow path;

an ultrasonic transmitter and an ultrasonic receiver disposed on both sides of said flow path in a portion downstream of said vortex shedder and spaced apart from said vortex shedder by a predetermined distance, said transmitter and receiver being offset from each other along a flow direction of said flow path and said transmitter emits ultrasonic waves as consecutive pulses of a regular interval;

a memory means for storing first data representative of a relation between generation frequency of Karman vortices generated by said vortex shedder and a flow rate of fluid flowing in said flow path and second data representative of a relation between (a) a difference of an ultrasonic wave propagation time relative to the reference propagation time when the flow rate of fluid flowing in said flow path is substantially zero; and (b) the flow rate of the fluid flowing in said flow path;

a first calculation means for determining the generation frequency of the Karman vortices on the basis of a detection signal obtained from said ultrasonic receiver and for determining the flow rate on the basis of the first data;

a second calculation means for measuring the ultrasonic wave propagation time between said ultrasonic transmitter and said ultrasonic receiver, for determining a difference between the ultrasonic wave propagation time when the flow rate of the fluid is substantially zero and the measured ultrasonic wave propagation tie and for determining the flow rate of the fluid flowing in said flow path from the difference between the ultrasonic wave propagation times on the basis of the second data; and an output switching means for switching an output so that, when the flow rate of the fluid is greater than a predetermined value, the flow rate of the fluid determined by said first calculation means is outputted and, when the flow rate of the fluid is smaller than the predetermined value, the flow rate of the fluid determined by said second calculation means is outputted.

2. A vortex flowmeter according to claim 1, wherein said output switching means effects the switching so that, when the flow rate of the fluid determined by said second calculation means is greater than the predetermined value, the flow rate of the fluid determined by said first calculation means is outputted and, when the flow rate of the fluid determined by said second calculation means is smaller than the predetermined value, the flow rate of the fluid determined by said second calculation means is outputted.

3. A vortex flowmeter according to claim 1, further comprising a temperature measuring means for measuring the temperature of the fluid, and wherein said memory means stores third data representing a relation between an ultrasonic wave propagation time from said ultrasonic transmitter to said ultrasonic receiver when the flow rate of the fluid flowing in said flow path is substantially zero and the temperature of the fluid; and said second calculation means measures the ultrasonic wave propagation time between said ultrasonic transmitter and said ultrasonic receiver and the current temperature of the fluid from said temperature measuring means, determines a difference between the ultrasonic wave propagation time when the flow rate is substantially zero and the measured ultrasonic wave propagation time on the basis of the third data, and determines the flow rate of the fluid flowing in said flow path from the ultrasonic wave propagation time difference on the basis of the second data.

4. A vortex flowmeter comprising:

a vortex shedder provided in a flow path;

an ultrasonic sensor means comprised of a pair of transmission/reception portions disposed on both sides of said flow path in a portion downstream of said vortex shedder and spaced apart from said vortex shedder by a predetermined distance, said transmission/reception portions being offset from each other along a flow direction of said flow path and each of said transmission/reception portions emits ultrasonic waves as consecutive pulses of a regular interval;

a memory means for storing first data representative of a relation between generation frequency of Karman vortices generated by said vortex shedder and a flow rate of fluid flowing in said flow path and second data representative of a relation between (a) a difference in an ultrasonic wave propagation time between the case when one said pair of transmission/reception portions performs transmission and the case when the other transmission/reception portion performs transmission; and (b) the flow rate of the fluid flowing in said flow path;

a first calculation means for determining the generation frequency of the Karman vortices on the basis of a detection signal obtained from a reception portion of said ultrasonic sensor means and for determining the flow rate on the basis of the first data;

a second calculation means for determining a difference between an ultrasonic wave propagation time when said ultrasonic sensor means performs transmission from the upstream side to the downstream side and an ultrasonic wave propagation time when said ultrasonic sensor means performs the transmission from the downstream side to the upstream side and for determining the flow rate of the fluid flowing in said flow path on the basis of the second data; and an output switching means for switching an output so that, when the flow rate of the fluid is greater than a predetermined value, the flow rate of the fluid determined by said first calculation means is outputted and, when the flow rate of the fluid is smaller than the predetermined value, the flow rate of the fluid determined by said second calculation means is outputted.

5. A vortex flowmeter according to claim 4, wherein said output switching means effects the switching so that, when the flow rate of the fluid determined by said third calculation means is greater than the predetermined value, the flow rate of the fluid determined by said first calculation means is outputted and, when the flow rate of the fluid determined by said third calculation means is smaller than the predetermined value, the flow rate of the fluid determined by said third calculation means is outputted.

6. A vortex flowmeter according to claim 1, wherein said predetermined distance is equal to a vortex generating distance for the Karman vortices from said vortex shedder.

7. A vortex flowmeter according to claim 2, further comprising a temperature measuring means for measuring the temperature of the fluid, and wherein said memory means stores third data representing a relation between an ultrasonic wave propagation time from said ultrasonic transmitter to said ultrasonic receiver when the flow rate of the fluid flowing in said flow path is substantially zero and the temperature of the fluid; and said second calculation means measures the ultrasonic wave propagation time between said ultrasonic transmitter and said ultrasonic receiver and the current temperature of the fluid from said temperature measuring means, determines a difference between the ultrasonic wave propagation time when the flow rate is substantially zero and the measured ultrasonic wave propagation time on the basis of the third data, and determines the flow rate of the fluid flowing in said flow path from the ultrasonic wave propagation time difference on the basis of the second data.

8. A vortex flowmeter according to claim 2, wherein said predetermined distance is equal to a vortex generating distance for the Karman vortices from said vortex shedder.

9. A vortex flowmeter according to claim 3, wherein said predetermined distance is equal to a vortex generating distance for the Karman vortices from said vortex shedder.

10. A vortex flowmeter according to claim 4, wherein said predetermined distance is equal to a vortex generating distance for the Karman vortices from said vortex shedder.

11. A vortex flowmeter according to claim 5, wherein said predetermined distance is equal to a vortex generating distance for the Karman vortices from said vortex shedder.

* * * * *